July 30, 1940.  F. C. EDWARDS  2,209,392

TRUCK BASE FOR LOAD-LIFTING MACHINERY

Filed April 27, 1938  2 Sheets-Sheet 1

Frank C. Edwards
INVENTOR.

BY
ATTORNEY.

July 30, 1940.    F. C. EDWARDS    2,209,392
TRUCK BASE FOR LOAD-LIFTING MACHINERY
Filed April 27, 1938    2 Sheets-Sheet 2
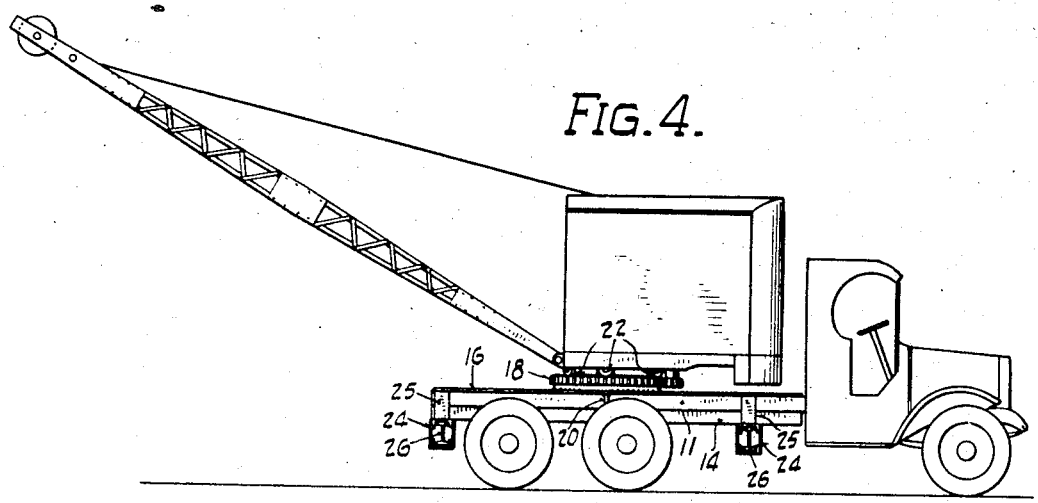
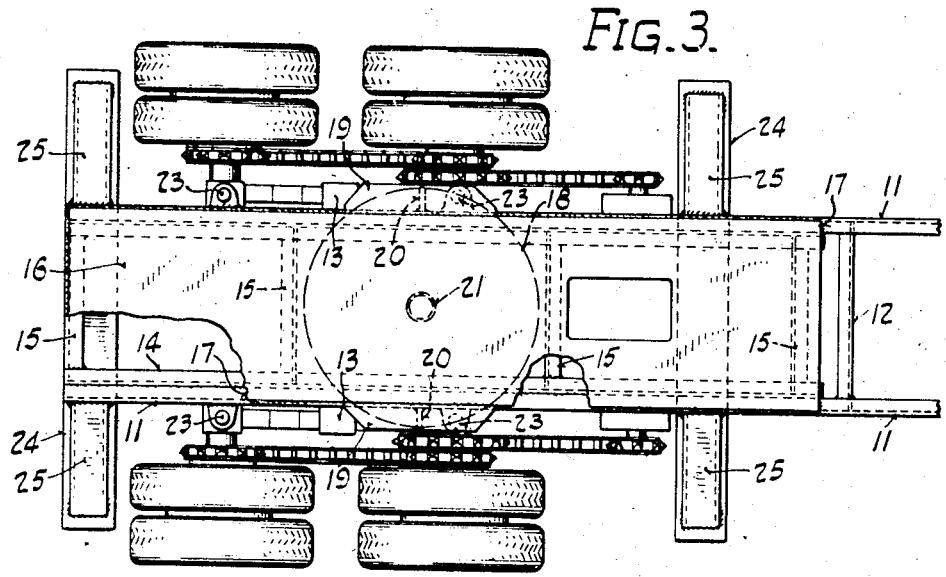
Frank C. Edwards
INVENTOR.
BY
ATTORNEY.

Patented July 30, 1940

2,209,392

UNITED STATES PATENT OFFICE 2,209,392

TRUCK BASE FOR LOAD-LIFTING MACHINERY

Frank C. Edwards, Englewood, N. J., assignor to Harnischfeger Corporation, Milwaukee, Wis., a corporation of Wisconsin Application April 27, 1938, Serial No. 204,562

14 Claims. (Cl. 212—38)

This invention relates to rotating cab cranes and excavating machinery.

More specifically, it is concerned with a base construction for such machinery adapted to be inserted between the main longitudinal members of an automotive vehicle frame in such manner that the base furnishes enhanced rigidity and distributes the load over the length of said automotive vehicle frame, yet does not materially contribute to the overall height of the resulting assembly.

Crawler type cranes and excavators are subject to a serious handicap in limited mobility. It has, therefore, become common to mount rotating-cab hoisting and excavating machinery on wheeled vehicles of the automotive type. Machines thus assembled have a high mobility and may be moved wherever road surfaces permit at speeds far greater than the maximum speed of crawler type equipment. Such mobile machinery, however, has ordinarily been of light duty character, the size being limited by the strength of the frame of the usual heavy duty motor truck, which is of relatively light construction compared to the high capacity machinery commonly employed for hoisting and excavating work.

In an attempt to increase the size of the machinery which may be employed in such mobile units, use has been made of auxiliary frames placed on top of the regular truck frames to increase the rigidity and to distribute the load over the length thereof. By such mounting, machinery of much greater weight and capacity may be utilized. Such assemblies, however, are seriously handicapped by the increase in height which this involves. Machinery of this type is often of such total height that even the few inches more added by the auxiliary frame may offer serious difficulties to the passing of bridges, elevated railways, and other overhead structures. Moreover, even a slight increase of the height of the center of gravity may adversely affect the stability, and thus the capacity, of the machinery under working conditions.

By the present invention both of these problems have been solved. A turntable base has been provided which is materially stronger than that offered by an ordinary truck frame, and at the same time the height of the base is no greater than when utilizing the ordinary motor truck frame.

The accompanying drawings show an illustrative embodiment of the invention, in which a rotating cab frame is mounted upon a standard six-wheel automobile truck, by means of the novel turntable base of this invention.

In the drawings:

Fig. 3 is a top view of the truck with the turntable base mounted therein, as shown in Fig. 2;

Fig. 4 is a side view of the assembled unit on a reduced scale.

Figure 1:
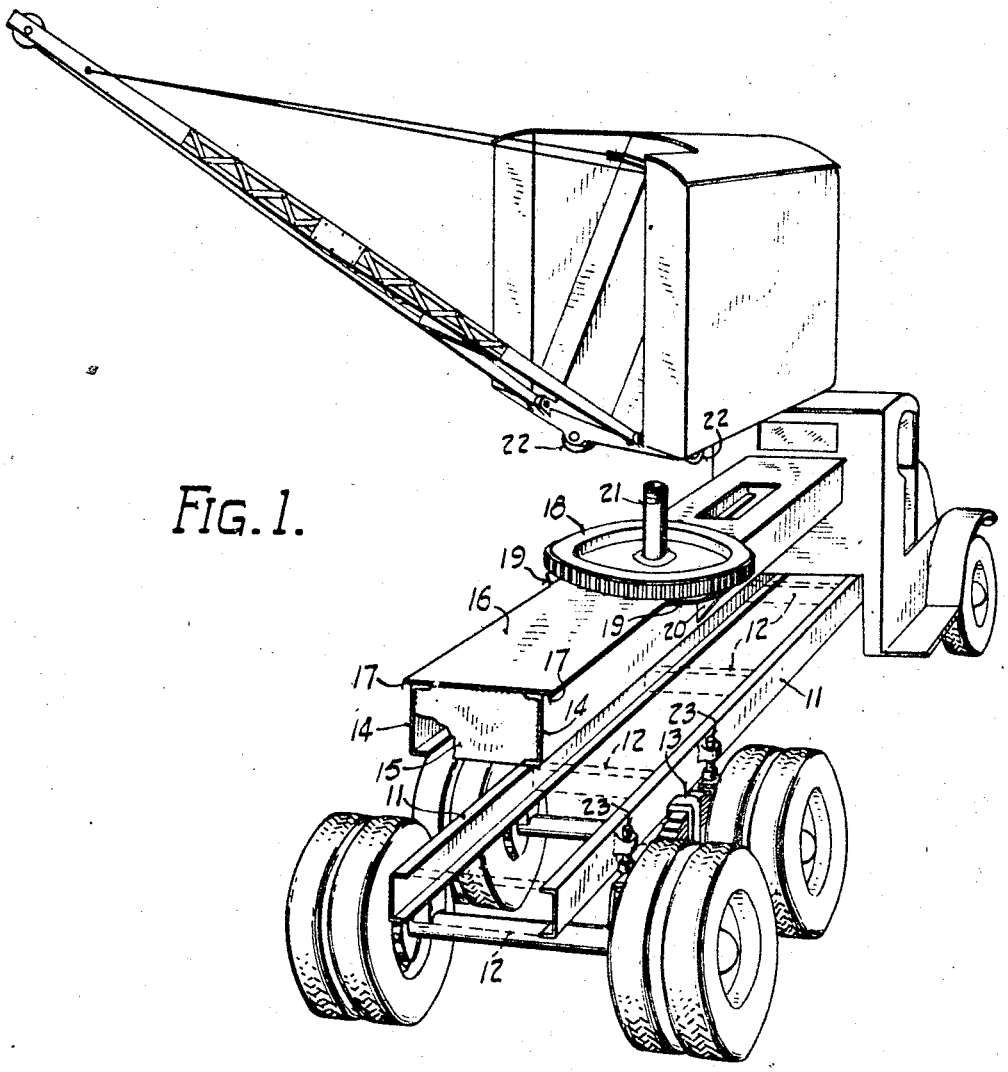
Fig. 1 is an expanded perspective view, showing the novel turntable base and indicating its relationship to the automotive vehicle and the rotating cab unit in the completed assembly.
Figure 2:
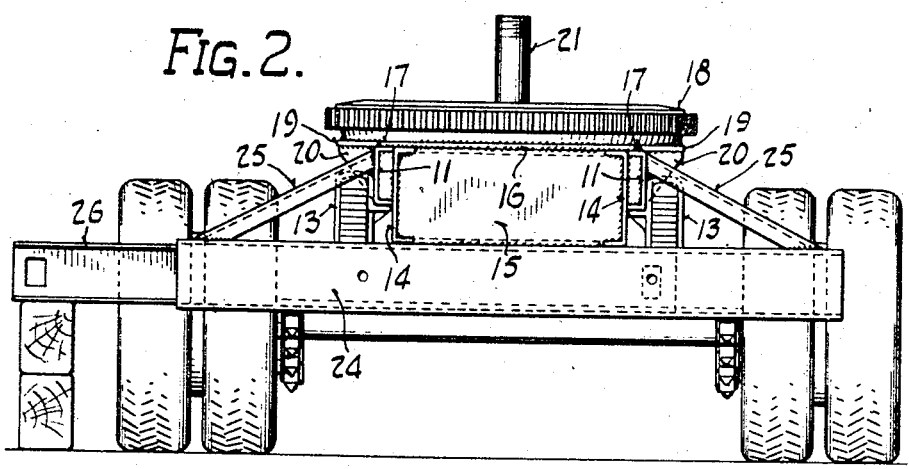
Fig. 2 is an end view of the truck with the new turntable base assembled therewith.

In the form of the invention shown in the drawings, the automotive part of the assembly is a standard motor truck, as shown in Fig. 1. The original frame of the truck consists of two channel-beam longitudinal members 11, connected by cross-members shown in dotted lines at 12. The rear springs 13 of the truck are mounted on the outside of the longitudinal members 11 and serve to support the frame on the rear wheels of the truck.

For the purposes of the present invention the cross-members 12 of the original frame are cut away and an auxiliary frame inserted in their place between the side-bars of the truck frame. This auxiliary frame comprises side-beams 14 and connecting cross-beams 15. The side-beams 14 adjoin the longitudinal members 11 of the truck frame, and are securely fastened thereto, as by welding. Like the parts of the truck frame, the side-beams 14 may be of channel form and may be much larger and stronger than the original longitudinal members of the truck frame. The auxiliary frame is positioned, however, with the tops of the beams 14 and 15 level with the top of the original longitudinal members of the truck frame, so that the larger size of the beams does not raise the level of the truck floor.

The auxiliary frame also has a coverplate 16 of heavy rolled metal securely welded to the beams 14 and 15. The coverplate 16 is itself of great strength, materially strengthening the turntable base, and assisting to distribute the superimposed load. Moreover, it is made somewhat wider than the other parts of the auxiliary frame so that an over-lapping portion 17 on either side extends beyond the side-beams 14 and bears upon the longitudinal members 11 of the original frame, in which position it is securely welded. The coverplate 16 thus serves to distribute a portion of the superimposed weight directly to the original longitudinal members 11.

The coverplate 16 also forms a continuous floor for the attachment of a cirular track for the rotating machinery. In the form shown in the drawings a single-large swing-gear 18 is employed, which also serves as a track for the rotating cab. This gear 18 is welded continuously to the coverplate 16.

Since the gear 18 may be of larger diameter than the width of the coverplate 16, additional lateral supports are provided. Directly beneath the laterally-projecting portions of the gear the coverplate 16 has lateral extensions 19 and heavy brackets 20 brace these extensions against the side of the longitudinal members 11.

From the center of the swing-gear 18 there projects a pintle 21 serving as a pivot for the rotating crane. The weight of the crane is supported by rollers 22 traveling upon the circular track, which in this case is formed by the upper surface of the rim of the swing-gear 18.

When lifting heavy loads the truck springs 13 are relieved of the weight by jacks 23 fastened to the longitudinal members 11 and supporting the weight directly on the axles of the truck. For very heavy loads, however, especially loads at large radii, additional support if furnished by outriggers at the back and front of the auxiliary frame. Each of these outriggers consists of a heavy cross-beam 24, of box form, welded to the underside of the side-beams 14. Braces 25 run from the ends of the box-beams 24 to the longitudinal members 11. Within the box-beam 24 is inserted an I-beam 26, which is free to move lengthwise and so can be extended to either side, as desired, to increase the leverage of the outrigger beam. Blocks may be placed under the outrigger beam 24 or 26, at any position desired, to sustain the weight as the load is lifted.

By a construction such as that described above there is produced a turntable base of great strength and rigidity, able to carry a great weight while traveling and which may be quickly braced to support an even greater load while at rest. With all this increase in load capacity, however, the turntable base is no higher than the frame of the ordinary truck, on which it is mounted, so that no increase is produced in the total height of the assembled unit. The turntable base of this invention further constitutes a unitary assembly which may be mounted directly upon a truck chassis without disturbance of any of the parts thereof except for the removal of the chassis cross-members.

The embodiment of the invention described above is, of course, illustrative only and various changes may be made therein without departing from or sacrificing the invention therein disclosed.

I claim:

1. In rotating cab machinery, a turntable base adapted to be combined with a vehicle having longitudinal frame members, said base comprising side-beams bearing a turntable and adapted to be inserted between said longitudinal frame members adjacent and parallel thereto, and cross-beams connecting said side beams.

2. In rotating cab machinery, a turntable base adapted to be combined with a vehicle having longitudinal frame members, said base comprising side-beams bearing a turntable and adapted to be inserted between said longitudinal members adjacent and parallel thereto with the tops of said side-beams on the same level as the tops of said longitudinal members.

3. In rotating load-lifting machinery, a turntable base adapted to be combined with a vehicle having longitudinal frame members, said base comprising side-beams adapted to be inserted between said longitudinal frame members adjacent and parallel thereto, and a cover-plate secured to said side-beams and extending laterally therefrom onto said longitudinal frame members, said coverplate being adapted to receive load-bearing machinery and to distribute the weight therefrom to said side beams and said longitudinal frame members.

4. In load-lifting machinery, a base adapted to be combined with an automotive vehicle frame having longitudinal frame members, said base comprising side-beams adapted to be inseretd between said longitudinal members adjacent and parallel thereto, and a horizontal element supported by said side-beams and adapted to receive load-lifting machinery, said element having portions extending laterally beyond said side-beams and adapted to bear on said longitudinal frame members to thereby distribute to said members a portion of the weight from said machinery.

5. In rotating load-lifting machinery, a turntable base adapted to be combined with an automotive vehicle frame having longitudinal frame members, said base comprising side-beams adapted to be inserted between said longitudinal frame members adjacent and parallel thereto to be supported thereby, and a track for rotating load-lifting machinery supported by said side-beams.

6. In rotatably mounted machinery, a turntable base adapted to be combined with an automotive vehicle having longitudinal frame members, said base comprising side-beams adapted to be inserted between said longitudinal frame members, and a track for a rotatable machine, said track being supported by said side-beams and being adapted to receive support from said longitudinal frame members independently of said side-beams.

7. In rotating load-lifting machinery, a turntable base adapted to be combined with an automotive vehicle having longitudinal frame members, said base comprising side-beams adapted to be inserted between said longitudinal frame members, a circular track for rotating load-lifting machinery extending between and beyond said side-beams, and a coverplate supporting all portions of said track and distributing the weight therefrom to said side-beams.

8. In rotating load-lifting machinery, a turntable base adapted to be combined with a vehicle having longitudinal frame members, said base comprising side-beams adapted to be inserted between said longitudinal frame members, a circular track for rotating load-lifting machinery, said track having portions extending laterally beyond said side beams, means distributing the weight from said track to said side-beams, and supports for said laterally extending portions adapted to distribute the weight therefrom to said longitudinal members.

9. In load-lifting machinery, the combination of a standard automobile truck having longitudinal frame members, and a turntable base inserted between said members and secured thereto, the top of said base being on the same level as the top of said members.

10. The combination with an automotive vehicle frame having longitudinal frame members, of a turntable base for rotating load-lifting machinery, said base being inserted between said longitudinal frame members and being secured thereto substantially throughout the length of said base to distribute the weight of said machinery along said longitudinal frame members.

11. In load-lifting machinery, the combination of an automotive vehicle frame having longitudinal frame members, side beams inserted between and parallel to said longitudinal members in contact therewith and secured thereto, and means supported by said side beams adapted to receive load-lifting machinery.

12. In load-lifting machinery, the combination of an automotive vehicle frame having longitudinal frame members, side-beams inserted between said longitudinal members and secured thereto substantially throughout the length of said side beams, and means supported by said side-beams adapted to receive load-lifting machinery, said means being additionally supported by said longitudinal frame members independently of said side beams.

13. The combination with an automotive vehicle frame having longitudinal frame members, of a machinery base comprising side-beams and a coverplate supported thereby and adapted to receive load-lifting machinery, the side-beams being inserted between and against the longitudinal frame members and secured thereto, the coverplate having side portions overlapping said longitudinal frame members and bearing thereon to distribute to said members a portion of the weight of said machinery.

14. In rotating load-lifting machinery, the combination of an automotive vehicle frame having longitudinal frame members, side-beams inserted between said members and secured thereto, a coverplate bearing on said side-beams and said members and secured thereto, and a circular track for load-lifting machinery supported by said coverplate, said track having portions extended laterally beyond said longitudinal members, said coverplate having lateral extensions beneath said extended portions of the track to distribute the weight thereof to said longitudinal members.

FRANK C. EDWARDS.